(12) United States Patent
Pusch et al.

(10) Patent No.: US 12,508,137 B2
(45) Date of Patent: Dec. 30, 2025

(54) PROSTHETIC FOOT COMPONENT

(71) Applicant: Ottobock SE & Co. KGAA, Duderstadt (DE)

(72) Inventors: Martin Pusch, Duderstadt (DE); Carsten Moenicke, Duderstadt (DE); Hannes Krenz, Dresden (DE)

(73) Assignee: OTTOBOCK SE & CO. KGAA, Duderstadt (DE)

( * ) Notice: Subject to any disclaimer, the term of this patent is extended or adjusted under 35 U.S.C. 154(b) by 0 days.

(21) Appl. No.: 17/425,714

(22) PCT Filed: Jan. 24, 2020

(86) PCT No.: PCT/EP2020/051783
§ 371 (c)(1),
(2) Date: Jul. 23, 2021

(87) PCT Pub. No.: WO2020/152341
PCT Pub. Date: Jul. 30, 2020

(65) Prior Publication Data
US 2022/0183863 A1 Jun. 16, 2022

(30) Foreign Application Priority Data
Jan. 25, 2019 (DE) .......................... 102019101835.8

(51) Int. Cl.
*A61F 2/66* (2006.01)
*A61F 2/50* (2006.01)

(52) U.S. Cl.
CPC ........ *A61F 2/66* (2013.01); *A61F 2002/5009* (2013.01); *A61F 2002/5021* (2013.01);
(Continued)

(58) Field of Classification Search
CPC .................. A61F 2/60; A61F 2/66–2002/6664
See application file for complete search history.

(56) References Cited

U.S. PATENT DOCUMENTS

| 5,156,632 | A | 10/1992 | Wellershaus |
| 2005/0038525 | A1 | 2/2005 | Doddroe |

(Continued)

FOREIGN PATENT DOCUMENTS

| CN | 1988861 A | 6/2007 |
| CN | 101569567 A | 11/2009 |

(Continued)

OTHER PUBLICATIONS

Britannica, The Editors of Encyclopaedia. "polyurethane". Encyclopedia Britannica, Sep. 9, 2022, https://www.britannica.com/science/polyurethane (Year: 2022).*

(Continued)

*Primary Examiner* — Rebecca S Preston
(74) *Attorney, Agent, or Firm* — HOLLAND & HART LLP

(57) ABSTRACT

The invention relates to a prosthetic foot component comprising a proximal fastening system for securing the prosthetic foot component to a proximal component, a retaining portion situated distally relative to the fastening system and coupled to the latter, an elastic heel element provided on the retaining portion, and a main spring extending in a front-foot region and coupled to the retaining portion, wherein the main spring is mounted in the heel element between a proximal heel component and a distal heel component.

29 Claims, 13 Drawing Sheets

(52) U.S. Cl.
CPC . *A61F 2002/503* (2013.01); *A61F 2002/5079* (2013.01); *A61F 2002/6614* (2013.01); *A61F 2002/6642* (2013.01); *A61F 2002/6664* (2013.01)

(56) References Cited

U.S. PATENT DOCUMENTS

| | | | |
|---|---|---|---|
| 2005/0187640 A1* | 8/2005 | Christensen | A61F 2/66 623/55 |
| 2005/0267603 A1* | 12/2005 | Lecomte | A61F 2/66 623/50 |
| 2006/0041321 A1* | 2/2006 | Christensen | A61F 2/6607 623/38 |
| 2006/0069450 A1 | 3/2006 | McCarvill et al. | |
| 2006/0167563 A1* | 7/2006 | Johnson | A61F 2/66 623/55 |
| 2009/0012630 A1* | 1/2009 | Mosler | A61F 2/68 623/53 |
| 2011/0320012 A1* | 12/2011 | Christensen | A61F 2/66 623/55 |
| 2012/0046760 A1 | 2/2012 | Nissels | |
| 2013/0024007 A1 | 1/2013 | Kaltenborn et al. | |
| 2015/0190247 A1 | 7/2015 | Mosler | |
| 2015/0328020 A1 | 11/2015 | Clausen | |
| 2016/0158030 A1* | 6/2016 | Doddroe | A61F 2/66 623/50 |
| 2017/0042703 A1* | 2/2017 | Pusch | A61F 2/68 |
| 2017/0128236 A1 | 5/2017 | Meyer | |
| 2017/0135828 A1* | 5/2017 | Friesen | A61F 2/66 |
| 2017/0325974 A1* | 11/2017 | Lincoln | A61F 2/6607 |
| 2018/0014949 A1* | 1/2018 | Grosskopf | A61F 2/66 |
| 2018/0235780 A1* | 8/2018 | Wilson | A61F 2/5044 |
| 2019/0070022 A1 | 3/2019 | Pusch et al. | |

FOREIGN PATENT DOCUMENTS

| | | |
|---|---|---|
| CN | 106456341 A | 2/2017 |
| DE | 4038063 A1 | 4/1995 |
| DE | 102004020368 A1 | 12/2005 |
| DE | 102011014994 A1 | 9/2012 |
| DE | 102014010938 A1 | 1/2016 |
| DE | 102015101746 A1 | 8/2016 |
| EP | 1976463 A1 | 10/2008 |
| EP | 2420212 A1 | 2/2012 |
| EP | 2688522 B1 | 1/2019 |
| JP | 2009-524458 A | 7/2009 |
| RU | 2587956 C2 | 9/2014 |
| WO | 2005102208 A3 | 11/2005 |
| WO | 2005117749 A2 | 12/2005 |
| WO | 2007085228 A1 | 8/2007 |
| WO | 2012126633 A1 | 9/2012 |
| WO | 2016016147 A1 | 2/2016 |
| WO | 2016124703 A1 | 8/2016 |

OTHER PUBLICATIONS

International Search Report and Written Opinion issued in International Application No. PCT/EP2020/051783 on Jan. 24, 2020, 13 pgs.
Japanese Patent Application No. 2021-541099; Search Report dated Nov. 30, 2023; 24 pgs.
Japanese Patent Application No. 2021-541099; Notice of Reasons of Refusal dated Nov. 28, 2023; 6 pgs.
China Patent Office "Search Report", issued in connection with China Patent Application No. 202080010343.X received Feb. 24, 2025 (2 pages of English Translation / Original Document unavailable).

* cited by examiner

PROSTHETIC FOOT COMPONENT

CROSS-REFERENCE TO RELATED APPLICATIONS

This is a national phase application of International Application No. PCT/EP2020/051783, filed 24 Jan. 2020, which claims the benefit of German Patent Application No. 102019101835.8, filed 25 Jan. 2019, the disclosures of which are incorporated, in their entireties, by this reference.

TECHNICAL FIELD

The invention relates to a prosthetic foot insert with a proximal fastening device for securing the prosthetic foot insert to a proximal component, a holder arranged distally with respect to the fastening device and coupled to the fastening device, an elastic heel element which is arranged on the holder, and a main spring which extends into a forefoot region and is coupled to the holder.

BACKGROUND

Prosthetic foot inserts are part of a prosthetic fixture, for example for below-knee amputees. Prosthetic foot inserts can be provided with a prosthesis covering, which can be made of a plastic, in order to achieve the most natural possible appearance and to provide further functionality. The prosthetic foot inserts can be fastened to an ankle joint or, without a joint, to a lower-leg tube or a lower-leg socket. The fastening device is generally designed as what is called a pyramid adapter, via which multiple settings and orientations of the prosthetic foot insert can be adjusted and fixed in relation to the proximal component, i.e. to the lower-leg tube, the prosthesis socket or the ankle joint. The fastening device is fastened to a holder, on which in turn a spring, extending in the forefoot direction, for example a forefoot spring or a roof spring, can be arranged. In order to damp an impact at heel strike, an elastic heel element is provided, which is fastened to the holder, if appropriate with interpositioning of intermediate pieces. Examples of a prosthetic insert are described in EP 2 420 212 A1, EP 1 976 463 A1, US 2005/0038525 A1 or EP 2 688 522 B1.

The problems with prosthetic foot inserts from the prior art are the installation space that may be required, an unsatisfactory bending behavior, an uneven rollover behavior, and difficulties in compensating for unevenness. In addition, complex shapes are sometimes necessary, which increase the production costs and cause difficulties in the optimal utilization of materials.

SUMMARY

The object of the present invention is therefore to make available a prosthetic foot insert which, with a small installation space, permits optimum utilization of material along with a simple design.

According to the invention, this object is achieved by a prosthetic foot insert having the features of the main claim. Advantageous embodiments and developments of the invention are disclosed in the subclaims, the description and the figures.

In the prosthetic FIfoot insert with a proximal fastening device for securing the prosthetic foot insert to a proximal component, a holder arranged distally with respect to the fastening device and coupled to the fastening device, an elastic heel element which is arranged on the holder, in particular fastened thereto, and a main spring which extends into a forefoot region and is coupled to the holder, provision is made that the main spring is mounted on the heel element between a proximal heel component and a distal heel component. The holder and the fastening device can be formed together in one piece or can be secured to each other as separate components, for example screwed, glued, latched or welded. The heel element is assigned to the holder, in particular screwed on, glued on, plugged on, latched, welded, or arranged or secured in a different way to transmit forces and/or moments to the holder. The heel element is thus divided in two, wherein a distal heel component is effective at the floor side or distally with respect to the main spring, while an upper, proximal heel component is effective in the direction of the holder. It is thereby possible to implement a series connection of the two heel components when the heel is loaded, as a result of which both heel components become effective. It is thereby possible to comfortably damp the impact when heel strike occurs. Both heel components interact during the entire pressure load on the heel element while walking or standing. In the case of a forefoot load, the main spring interacts with the distal heel component, as a result of which a dual use is obtained and therefore an improved material utilization. The prosthetic foot insert can be used as a basis for other structures such as a mechatronic joint, an ML adapter, an adapter for adjusting the heel heights, a hydraulic joint unit or the like.

In a variant of the invention, the distal heel component can be rigid, wherein the proximal heel component is secured to the holder and to the main spring. The proximal heel component is secured to the holder and to the main spring in a manner transmitting compressive forces and transmitting tensile forces, for example glued, welded, injection-molded, molded, additively manufactured or positively coupled, for example by screws, bolts, clips, bayonet locks, dovetail guides, angle rails or other fastening elements, resulting in particular in reversible securing to the holder and to the main spring and interchangeability. The distal heel component acts both during a forefoot load and a heel load.

The heel components are advantageously designed in the same way, such that they are exchangeable. It is thereby possible to achieve different spring characteristics with the same heel components during loading of the forefoot, by swapping the two components around. The distal heel component can be harder than the proximal heel component, in order to be able to set different deflection behavior during forefoot load and heel load. In the case of a heel load, both heel components arranged in series are effective, whereas, in the case of a forefoot load, it is only, or mainly, the distal heel component that acts.

In one embodiment of the invention, the main spring is embedded between the proximal and distal heel components. Advantageously, the main spring separates the proximal heel component from the distal heel component. The main spring lies between the two heel components and can be integrally formed with them or connected non-detachably to them. Likewise, in one development, securing to the main spring or a molding, a one-piece design in an additive manufacturing method or another permanent connection between the heel components and the main spring is realized. If the heel components are only coupled to each other in the direction of pressure, there is the possibility that, when the forefoot is loaded, only the distal heel component interacts with the main spring. If both heel components are coupled to the main spring so as to transmit tensile force and also to transmit compressive force, for example by means of positive locking, by gluing or the like, different expansion properties in the case of tensile loading and compressive loading can result in a different adjustment of the spring damper properties in the case of a forefoot load and a heel load. The proximal heel element is preferably fixed firmly on the holder, advantageously fixed detachably, in order to permit adaptation to different users or to different conditions of use. Likewise, the distal heel element is preferably arranged exchangeably on the main spring or pretensioned relative to the main spring, such that the distal heel component is always held on the ground-side surface of the main spring.

The distal heel component is preferably harder than the proximal heel component, such that a soft setdown under a heel load is achieved with a comparatively hard spring from the combination of the main spring and the distal heel component. As a result, in the region of the terminal stance phase, a high level of energy return and at the same time a high degree of control of the rollover movement can be achieved. In the case of a forefoot load, the main spring interacts with the distal heel component. In the case of a heel load, the two heel components of the elastic heel element act primarily, such that a soft heel is obtained during standing and when the heel is set down. In this way, particularly in the case of an articulated prosthetic foot, rapid plantar flexion is achieved, as a result of which increased stability of the knee is achieved after the foot has been fully set down.

In one embodiment of the invention, the main spring is coupled to the proximal heel component in a manner not transmitting tensile forces, so as only to have to subject the heel components to compressive loading. This increases the durability of the heel components, which can be formed in particular as foam elements or from an elastomer.

In one embodiment of the invention, the main spring is designed as a leaf spring, in particular as a straight leaf spring, which is arranged between the two heel components, advantageously separating the two heel components from each other. The design of a straight leaf spring has the advantage that production is extremely simple, particularly if the main spring is produced from a fiber-reinforced plastic. The springs can be produced from glass fibers, carbon fibers, aramid, Kevlar, Dyneema, etc., or from combinations thereof, embedded in a matrix. The main spring can be designed to be relatively stiff, such that the durability increases, since a stiff spring configuration of the main spring is compensated via the distal heel component when the forefoot is loaded, and therefore sufficient flexibility is achieved even with forefoot loading.

In a development of the invention, provision is made that the holder has a projection which protrudes in the direction of the forefoot region past the fastening element and which is supported on the main spring. The support does not have to be effected directly on the main spring. Intermediate pieces, one or more joints, one or more elastomer elements or the like can also be provided between the holder and the main spring. By way of the projection, it is possible to vary the location of force application. During walking, rollover or standing, when the force vector migrates in front of the vertical through the fastening element, forces are introduced from the holder onto the main spring. In the forefoot region, the main spring is also supported on the ground, such that the bending load of the main spring can be initiated in the midfoot region by force being introduced via the projection.

In a development, the holder is supported on the main spring at two points spaced apart from each other in the longitudinal extent of the main spring, either directly or via an intermediate spring or intermediate plate or a clasp, which is preferably supported on the main spring at two points spaced apart from each other. The support of the intermediate spring or intermediate plate on the main spring can be achieved, for example, via two adhesive points or the like. If force is introduced via two points between the heel components and the front contact point or the front support point on the ground, for example by displacement of an intermediate spring or intermediate plate at two points on the main spring, a four-point bending takes place in the event of a forefoot load, as a result of which the maximum bending moment in the main spring is substantially reduced. In one embodiment, the intermediate spring is designed as a straight leaf spring, which is mounted on the main spring on two bearing elements, such that, for example when force is introduced centrally to the intermediate spring via the holder, the force is introduced into the main spring at two points. In contrast to the intermediate spring, the intermediate plate is substantially rigid or stiff to bending. Hereinafter, when reference is made to an intermediate spring, this is also to be understood as a rigid or substantially rigid plate, unless explicit reference is made to the elastic properties.

A guide element, which is mounted on the main spring, can be fastened to the heel element. The guide element can be mounted in an articulated manner on the main spring, for example in the front end region of the main spring. Alternatively, the guide element is designed as a straight leaf spring, for example made of a fiber composite material. The guide element in the form of a leaf spring can, for example, be connected to the main spring on the sole side and in the region of the toes, for example by screwing, and is coupled at the rear end to the heel element. The distal heel component can be secured directly to the guide element. Alternatively, a receptacle can be arranged on the guide element, via which receptacle the distal heel component is coupled to the guide element. Also in an embodiment of the guide element as a leaf spring, the guide element is intended to provide no spring action or only a slight spring action. For this purpose, provision is made that the guide element is very thin, with no or only a slight compression effect being exerted on the heel element in the originally mounted state by the spring action of the guide element. The fastening and design of the guide element blocks or restricts a medial-lateral movement of the heel element during the use of the prosthetic foot insert, such that the orientation and positioning of the heel element relative to the holder and to the main spring is stabilized. In addition, the guide element ensures the alignment of the heel element with respect to the main spring and to the fastening element, which is also advantageous when using a foot prosthesis cover. The guide element permits compression and expansion of the heel element; there are little or no restoring forces exerted by the guide element in the proximal-distal direction.

In one embodiment of the invention, provision is made that the heel element is coupled to the holder via at least one tensioning element. The tensioning element can be designed to be tensionally rigid and flexible, and it can likewise be designed as an elastic and flexible element, for example as a strap or a band or as a resilient element or elastomer element. The heel-side tensioning element can stabilize the heel component against lateral deflection, in particular if the tensioning element is guided medially and laterally along the outside of the heel components. A pre-compression of the heel components or of the entire heel element can be effected via the tensioning element, as a result of which a pretensioning required for balancing in the anterior-posterior direction is achieved. The tensioning element can be mounted in an adjustable manner, in particular so as to be able to be shortened or lengthened, on the holder and/or on the heel element or on a receiving part arranged thereon or assigned thereto. Alternatively, the pretensioning can be varied using inserts or spacers. The tensioning element can be designed as a closed loop, as a rod, as a cable or band connection or clip. The pretensioning can be changed by exchanging the loop, the band, the cable, the rod or the clip and inserting another tensioning element with a different circumference, a different length or a different span. A receptacle or a groove into which the tensioning element is inserted can be formed on the holder. In order to prevent the tensioning element from being accidentally removed from the holder, a mechanical securing device can be arranged over the groove, which securing device can be part of the fastening element for example. Changes in the pretensioning can also be achieved by pads or insert elements, which are arranged between the tensioning element and the heel element and/or the holder. Particularly in an embodiment of the tensioning element as a strap, wear can be reduced by one or more inserts or spacer elements, since direct contact with the rigid holder is avoided. The tensioning element holds the heel element in an unloaded starting position compressed position in a compressed position unloaded starting position. If a high heel load is applied, the tensioning element can be secured to the holder and/or to the heel element without tension. If a forefoot load is applied, the tensioning element forms the abutment for the main spring and the distal heel component. In the case of a forefoot load or a toe load, the distal heel component is tensioned against the main spring and subjected to a force, such that it is pressed against the spring. A tensionally rigid material is a material that permits no or only slight expansion, i.e. has a high level of rigidity to expansion. The modulus of elasticity is greater than five kilonewtons per square millimeter. The tensioning element can also have a certain elasticity and be designed as a band or differently shaped elastomer element.

The pretensioning of the one or more tensioning elements is adjustable, in particular to make a noticeable distinction between walking with an impulse load and standing with a somewhat static load. During walking, in particular during heel strike but also during the rollover movement, damping is intended to take place with a corresponding displacement of the components relative to one another. During standing, the user is intended to be given a feeling of stability, which is achieved by pretensioning the holder against the resilient elements or components. The pretensioning is preferably between 5% and 60% of the body weight of the user; in particular the pretensioning is between 5% and 40% of the body weight of the user, particularly preferably between 10% and 25% of the body weight of the user. In the latter case, the pretensioning of the holder by the tensioning element or the tensioning elements with respect to the heel element or the heel components and possibly the spring action of the main spring or of other resilient elements or components would be between 10 kg and 25 kg with a body weight of the user of 100 kg, which corresponds to a force of between approximately 98.1 N and 245.25 N.

In one embodiment of the invention, the tensioning element is guided distally with respect to the distal heel component, in order to bend an abutment against compression via the main spring when the forefoot is loaded. The tensioning element can be secured distally, for example to the guide element, or placed distally around the guide element. In an open configuration of the tensioning element or in a configuration with two tensioning elements, one guided medially and one guided laterally with respect to the heel element, the tensioning elements or the tensioning element can be individually fastened to the underside or to the distal end of the distal heel component.

A sole element, which can form a heel contour, can be arranged on the distal heel component or on the guide element. The sole element forms a distal closure of the heel element and can be arranged distally with respect to and on the guide element. The sole element can receive the guide element, for example in a slit or in a groove. The guide element can be secured in the sole element, for example screwed, cast or glued or the like, or only plugged in. The sole element can have a distal contour that is adapted or is adaptable to the respective user. A different contour may be required for transfemoral amputation patients than for a patient with a transtibial amputation. The tensioning element can be injected or integrated in the sole element in order to minimize wear. The sole element does not have to extend the entire length of the prosthetic foot insert. Advantageously, the sole element is located only in the heel region, so as not to impair the mechanical action of the other components such as the holder, main spring, intermediate spring or intermediate plate and heel element. The sole element can be glued on or provided with form-fit elements and clipped onto the guide element or fastened in some other way. Form-fit elements can be formed on the sole element, in order to receive and mechanically secure the distal heel component. A receptacle or a fastening element can be arranged distally on the sole element, so as to apply a contour element to the sole element in order to be able to adapt the contour of the sole element to the different users. On the outside of the sole element, projections or fastening devices can be arranged which permit form-fit engagement with projections or undercuts in a cosmetic foot cover.

In one embodiment, the holder is coupled to the main spring or the intermediate spring or an intermediate plate via a joint, which can be designed as a hinge or as a spring, for example a leaf spring. The joint is advantageously arranged centrally, i.e. in the middle region of the longitudinal extent of the main spring. On the joint or a spring plate is secured to the holder, which is advantageously dimensionally stable. The joint is advantageously secured in a rotationally fixed manner both to the holder and to the intermediate spring or the intermediate plate or the main spring. A displacement of the holder relative to the main spring is prevented via the joint or the securing of the joint to the holder and to the intermediate spring or intermediate plate or the spring. Furthermore, a slight twisting or rotation in the frontal plane is permitted by a spring plate or a joint, such as occurs when the forefoot is loaded. In an embodiment of the joint as a spring plate, the introduced force is distributed over a large support surface in the event of forefoot loading, as a result of which surface pressure is avoided. In this way, the intermediate spring or the main spring is protected against a high pressure load, such that the durability of the respective spring is increased. In addition, the attachment of the holder via a spring plate or a hinge joint ensures a permanent and displacement-free connection of the holder and thus of the fastening element to the main spring. An arrangement of the joint or of the force introduction via a spring plate in the midfoot region helps to optimally utilize the spring properties of the main spring and of the intermediate spring, if the latter is present.

At the front end of the main spring, a toe spring or a toe element can be arranged which permits adaptation to different foot sizes by simple arrangement, in particular screwing on, of a toe spring or of a toe element at the front end of the main spring. In addition, an adaptation to a right prosthetic foot insert or a left prosthetic foot insert can be achieved by the exchangeable securing of the toe spring or of the toe element to the main spring. This increases the number of identical parts that can be used for a right or left attachment of the prosthetic foot insert. Thus, similar central leaf springs are used as the main spring, and corresponding heel elements are used for both a right and a left prosthetic foot insert, and an adaptation to different foot sizes or for right or left use is made via the toe element or a toe spring. Instead of a detachable design, a non-detachable connection can also be made, for example by gluing. Non-detachable means that renewed connection is not possible with the same components. In addition, it is possible to use the toe spring or the toe element to influence the contour on the sole side and to set the energy management after maximum forefoot loading. The properties of the toe spring or of the toe element can permit further adaptation to the respective user of the prosthetic foot insert. The toe element can be designed to be foldable or pivotable with respect to the main spring or arranged on the prosthetic foot insert.

The heel components are advantageously made of at least a foam material, hollow body, elastomer element, carbon element, elastomer element with cavity as pump chamber and/or helical spring elements. At least one pump device or a pump element can be arranged in the heel element or between mutually displacing components of the prosthetic foot insert, for example in order to generate an underpressure in a proximal prosthesis component. The pump can be integrated in a heel component or can be arranged as a separate structural part or as a separate assembly between the holder and the main spring, the main spring and the guide element and/or the holder and the guide element and can be driven by the corresponding relative displacements. A restoring spring can be arranged parallel to the pump, which restoring spring is designed to be stronger than the vacuum to be generated, in order to permit resetting to an initial state.

The springs, in particular the main spring and the intermediate spring, are advantageously designed as straight leaf springs, as a result of which cost-effective production can be achieved and the material properties are optimally utilized.

In a development of the invention, provision is made that a damper or an actuator is arranged between the holder and the main spring. By way of the damper, it is possible to additionally influence a relative movement of the holder with respect to the main spring and to make available a further possibility of adaptation and adjustment to different gait situations, walking speeds, areas of use and/or patients. As an alternative to a design as a damper, in particular as a hydraulic damper or pneumatic damper, an actuator can be arranged between the holder and the main spring, via which actuator the relative position of the holder with respect to the main spring is adjustable. This permits, for example, adaptations to different heel heights for a single setting or continuous settings while walking at different walking speeds, loads or walking situations. The actuator is designed in particular as a motor and can also be used as a damper in generator mode. The damper can also be coupled to an adjusting device in order to adjust the valves within the damper, for example to lock or open them, in order to change the damping. The damping is preferably changed by motorized means, for which purpose the adjusting device is equipped with a motor which provides data via a control device and a sensor arrangement during walking and processes said data using a processor within the control device. On the basis of the sensor data, the control device, which can also have a corresponding data processing program, a memory and an energy supply, then sends a control signal to the motor in order to effect a corresponding adjustment.

The damper can be designed to be lockable, for example in order to fix a position once found, after loading or after a defined sinking or extension of the damper, until a new position is intended to be adopted. This can be done by the opening and closing of valves or by a mechanical locking device.

In a development of the invention, provision is made that the damper is assigned a sequence valve or that the damper contains a sequence valve which opens only when a predetermined force or a predetermined moment is exceeded and which permits a movement of the damper. The triggering force or the triggering moment can be set by a control motor or manually. In addition to a data processing device, a data store and, if appropriate, an energy store, the control has an actuator for adjusting the sequence valve. The triggering torque can be adjusted on the basis of sensor data that are processed in the processor of the control device.

In a development of the invention, provision is made that the holder is designed to be adjustable in order to set a proximal-distal distance between the fastening device and the main spring. By way of the holder, it is possible to change an adjustable proximal-distal distance, wherein the holder is preferably of a multi-part design and has a locking device via which the holder can be fixed in the respective position. For example, the holder can be designed in two parts with branches pivotable relative to each other, wherein the fastening device is arranged on or fastened to the upper, proximal branch. By means of the adjustable displacement, it is possible to adapt to different heel heights or to change the overall prosthesis structure by changing the orientation of the fastening device and thus of the proximal component.

In a development of the invention, provision is made that the fastening device is mounted on the holder in a displaceable, articulated or rotatable manner. By virtue of the displaceable, articulated or rotatable mounting of the fastening device in the or in the holder, it is possible to adapt to different heel heights or orientations. Preferably, the fastening device can be fixed in the respective position relative to the holder, for example by means of clamping screws, pins, teeth or the like.

BRIEF DESCRIPTION OF THE DRAWINGS

Illustrative embodiments of the invention are explained in more detail below with reference to the accompanying figures, in which.

DETAILED DESCRIPTION

Figure 1:
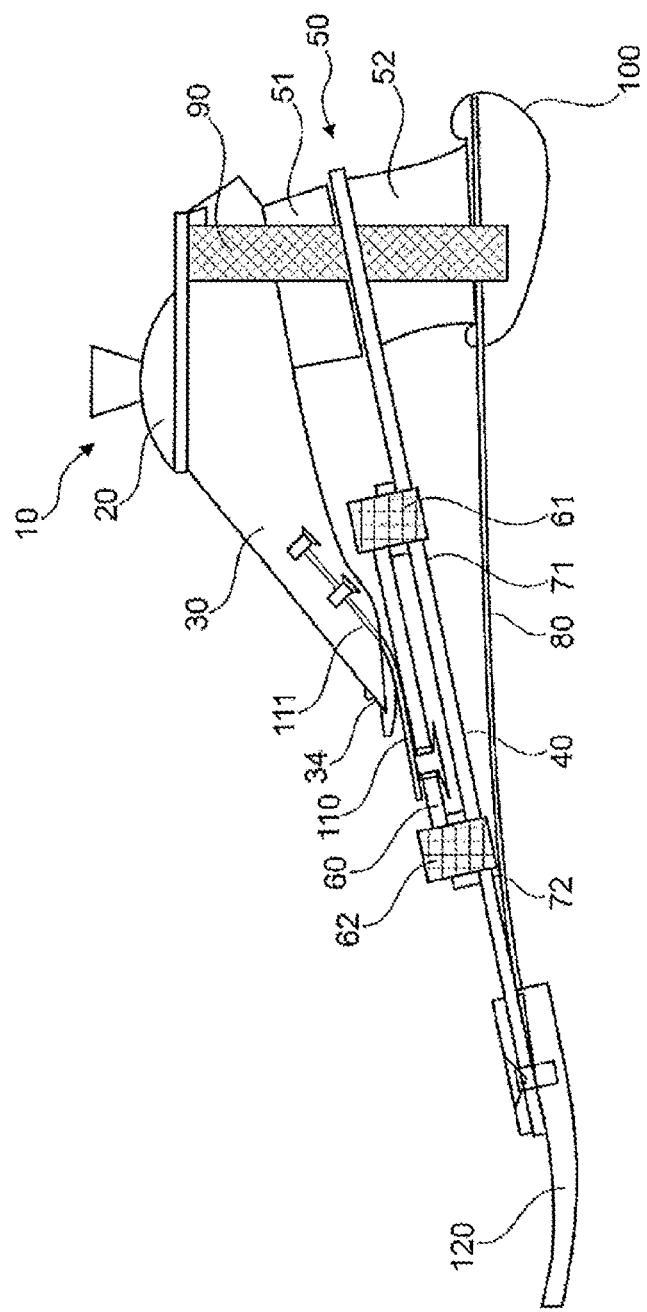
FIG. 1 shows a schematic view of a prosthetic foot insert.

FIG. 1 shows a schematic view of a prosthetic foot insert 10 with a proximal fastening device 20 which can be designed, for example, as a pyramid adapter. The proximal fastening device 20 can be formed in one piece with a holder 30 or, alternatively, the fastening device 20 can be detachably fastened to the holder 30. The holder 30 is made of a dimensionally stable material, for example a light metal, a composite material of a plastic with fibers embedded therein, a plastic or another suitable material, in order to take up and distribute forces and/or moments that are introduced from a proximal component (not shown) into the prosthetic foot insert 10 via the proximal fastening device 20. The holder 30 extends from the proximal fastening device 20 in the distal direction, that is to say downward, and in the anterior direction, that is to say forward in the walking direction. At the anterior end of the holder 30, which has a portion directed obliquely in the distal and the anterior direction, a projection 34 is arranged or formed in the illustrative embodiment shown, which projection 34 protrudes in the anterior direction beyond the fastening element 20. Likewise in the illustrative embodiment shown, a carrier 111 in the form of a leaf spring 111 is fastened to the holder 30 by two screws which protrude beyond the anterior end of the holder 30. The leaf spring 111 is coupled via a further screw to an intermediate spring 60 and forms a joint 110 between the intermediate spring 60 and the holder 30, such that a rolling or rotating movement of the holder 30 with the front end 34, which is rounded, can take place on the leaf spring 111 and thus on the intermediate spring 60.

The intermediate spring 60 is supported, via two blocks or intermediate pieces spaced apart from a main spring 40, in two regions 71, 72 that are spaced apart from each other in the longitudinal extent of the main spring 40. The intermediate spring 60 can in principle also be supported directly on the main spring 40 in two mutually spaced apart regions 71, 72 on the main spring 40, for example if the intermediate spring 60 forms an arc. The holder 30 can also be connected by some other means to the intermediate spring 60 in an articulated or pivotable manner.

In the illustrative embodiment shown, the intermediate spring 60 is fastened, together with the intermediate pieces, via straps or clamps 61, 62 to the main spring 40. As an alternative to fastening via straps or clamps 61, 62 that circumferentially enclose the intermediate spring 60, the intermediate pieces and the main spring 40, it is possible to fasten the intermediate spring 60 to the main spring via a screw connection or an adhesive connection. Advantageously, the intermediate spring 60 is secured reversibly to the main spring 40, if appropriate via the intermediate pieces, in order to be able to adapt to the respective patient or to changes in the intended use.

The main spring 40 extends from the rear or posterior end of the holder 30 into a forefoot region of the prosthetic foot insert 10 and can extend as far as the anterior end. In the illustrative embodiment shown, a separate toe spring 120 with a curved contour is arranged at the anterior end of the main spring 40 and is secured reversibly to the main spring 40 by a screw connection. The exchangeable toe spring 120 can be used to adapt to different shoe sizes or foot sizes and to adapt to the respective patient requirements as regards the rollover behavior, particularly in the terminal stance phase. With a stiff design of the toe spring 120, it is possible to increase the effective foot length of the prosthetic foot insert 10. If the toe spring 120 is chosen to be comparatively soft, the effective foot length of the prosthetic foot insert 10 is shortened. In addition to a screw connection as shown in FIG. 1, the toe spring 120 can be secured to the main spring 40 via a plug connection, a clip connection, an adhesive connection or a connection via other latching elements. In principle, instead of a toe spring 120, a rigid or substantially rigid toe element can be used and fastened to the main spring 40. The toe element 120 can be arranged to be foldable on the main spring 40, for example via a hinge.

Distally with respect to the main spring 40, a guide element 80 is fastened to the front end of the main spring 40. The fastening can be made reversible, for example together with the fastening of the toe spring 120. Alternatively, the guide element 80 can be separately secured directly to the main spring 40 in a reversible manner or with form-fit engagement or cohesive bonding, for example by gluing or welding. In a further embodiment, it is possible to secure the guide element 80 to the main spring 40 via the toe spring 120. In a further embodiment, the guide element 80 and the main spring 40 are connected to each other in a flexurally stiff manner, such that the guide element 80 can also be used as a spring. The guide element 80 is considerably thinner than the main spring 40, for example only half as thick or less than half as thick as the main spring 40. The guide element 80 can be designed as a leaf spring, just as the main spring 40 and the intermediate spring 60 are designed as leaf springs. All three leaf springs shown in the illustrative embodiment are designed as straight leaf springs, which is advantageous in terms of production, assembly, storage and durability. In the embodiment shown, the guide element 80 does not primarily have the role of providing a spring action; instead the guide element 80 serves for the medial-lateral guiding of a heel element 50, which is arranged at the posterior or rear end of the guide element 80. The guide element 80 can block a displacement in the medial-lateral direction and can be designed to be flexible or freely pivotable in the proximal-distal direction, i.e. to allow the rear or posterior end of the guide element 80 to be displaced with little or no resistance. A joint can be formed on the guide element 80, for example in the region of the fastening to the main spring 40 at the anterior end. The joint can be designed as a film hinge or a hinge with a fixed joint axis. The fastening of the guide element 80 can also be effected centrally, for example, or at any desired location. The main role of the guide element is to ensure the positioning of the heel element 50.

At the posterior end of the guide element 80, a sole element 100 is arranged which has a rounded shape facing toward the ground and which allows the rear part of the guide element 80 to set down and roll via the sole element 100. The sole element 100 can be arranged reversibly on the guide element 80. For this purpose, form-fit elements are provided via which the guide element 80 is fastened to the sole element 100, for example projections, spring clips, screws and threads, bolts, snap-fit connections or the like. Alternatively or in addition, guide element 80 and sole element 100 can be coupled to each other by cohesive bonding, for example via an adhesive connection.

A distal heel component 52 is arranged in the space between the main spring 40 and the guide element 80. A proximal heel component 51 is arranged between the main spring 40 and the holder 30. Both heel components 51, 52 are part of a heel element 50, which permits elastic support of the prosthetic foot insert 10 in the heel region. In the illustrative embodiment shown, the elastic heel element 50 is composed of the two heel components 51, 52, wherein the distal heel component 52 can be combined with the sole element 100 or forms a structural group from the two components. The sole element 100 can be part of the heel element 50 and has two projections which point in the proximal direction and which can also be designed as a circumferential projection or frame, wherein the frame is designed such that the distal heel component 52 can be fitted into this frame or between the two projections. In this way, the distal heel component 52 is aligned on the guide element 80 or the sole element 100 and is secured against displacement in the anterior, posterior and, if appropriate, medial-lateral direction. The distal heel component 52 is clamped between the main spring 40 and the guide element 80, with pretensioning by a tensioning element 90. The tensioning element 90 is guided medially and laterally with respect to the distal heel component 52, such that the tensioning element 90 prevents the distal heel component 52 from migrating sideways in the medial-lateral direction. In the illustrative embodiment shown, the tensioning element 90 is designed as a tensionally rigid, flexible tensioning element 90 in the form of a strap, for example a fabric band, which is brought together to form a loop. The tensioning element 90 is arranged on the holder 30, in the illustrative embodiment guided in a recess over the proximal end of the holder 30 and secured thereon via a disk or a securing element above the tensioning element 90. Alternatively, the tensioning element 90 can be secured medially and laterally to the holder 30 by means of screws, bolts, hooks or similar fastening elements. The tensioning element 90 is preferably secured reversibly to the holder 30.

The tensioning element 90 can be guided medially and laterally next to the main spring 40 and the guide element 80. Alternatively, it is possible that a slit is formed in the main spring 40, through which slit the tensioning element 90 is guided in the direction of the guide element 80. The tensioning element 90 can be guided under the guide element 80 through the sole element 100. Alternatively, the tensioning element 90 can be fastened to the guide element 80 or the sole element 100, such that one end of the tensioning element 90 is fastened to the holder 30 and the other end is fastened to the guide element 80 or the sole element 100. Preferably, two tensioning elements 90 are arranged on the prosthetic foot insert 10, one medially, the other laterally.

In the unloaded state shown in FIG. 1, the tensioning element 90 holds the heel element 50 in a compressed position, and the pretensioning is adjustable by changing the length of the tensioning element 90. The maximum distance of the guide element 80 or of the sole element 100 from the holder 30 is also defined via the tensioning element 90. When a tensile force is applied to the tensioning element 90, for example when the forefoot is loaded, the tensioning element 90 does not yield or does not substantially yield. Should a lengthening of the tensioning element 90 take place, it is not intended that the lengthening be so great that a compression between the main spring 40 and the guide element 80 on the distal heel component 52 is canceled. Instead of an embodiment of the tensioning element 90 as a loop, it can also be designed as a central strap, as a central cable or also as a flexible rod and be mounted in a guide on or through the heel components 51, 52, as a result of which the structural parts are also assigned to one another and medial and/or lateral displacement is prevented or reduced.

The heel components 51, 52 are made of an elastic material, in particular of an elastic foam material.

Figure 2:
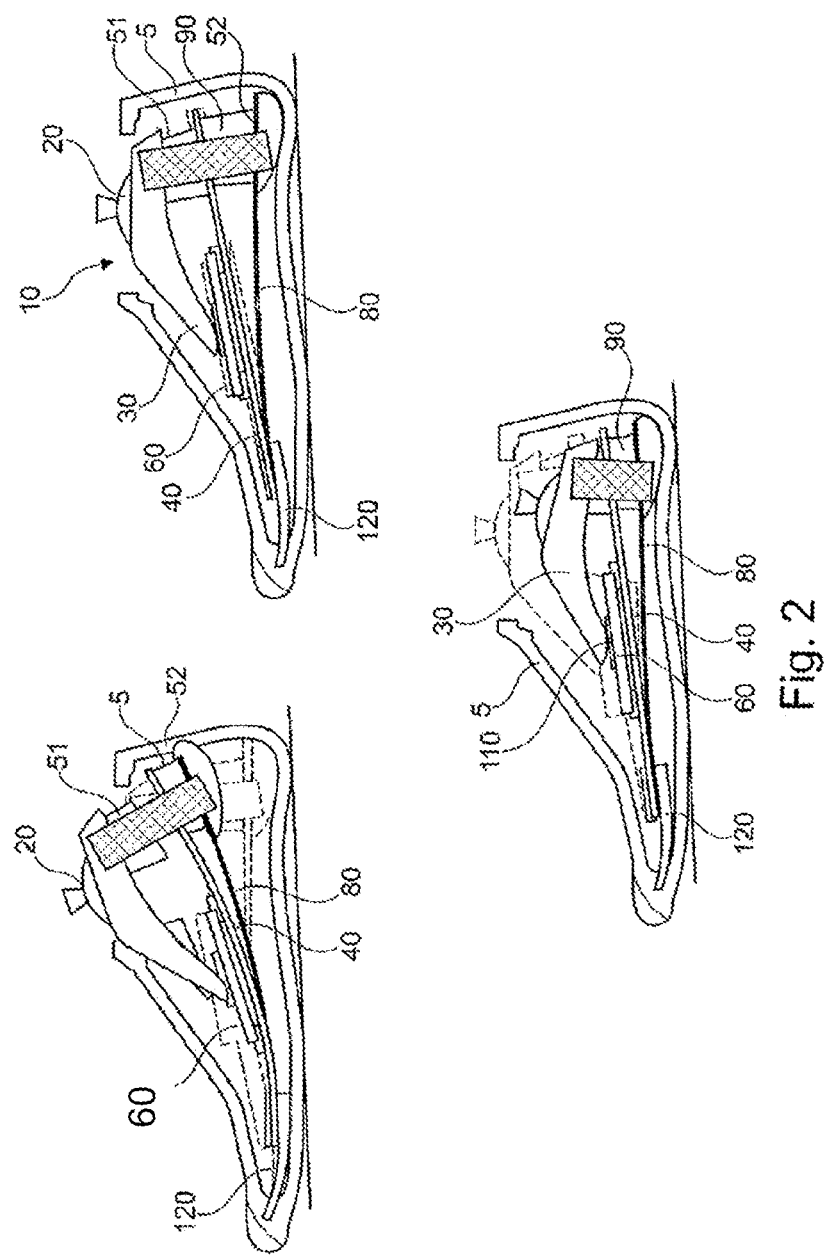
FIG. 2 shows three loading phases of the prosthetic foot insert in a foot cover.

The way in which the prosthetic foot insert functions is explained on the basis of the loading states shown in FIG. 2.

FIG. 2 shows three loading states of a prosthetic foot insert 10 in a foot cover 5. The middle view at the top right of FIG. 2 shows a relieved state of the prosthetic foot insert 10, the lower right view shows a prosthetic foot insert 10 at heel strike, the upper left view shows the prosthetic foot insert 10 at the end of the stance phase when the forefoot is loaded. The foot cover 5 is shown unchanged in the middle starting position in each case; the prosthetic foot inserts 10 are likewise shown in the starting position in the upper left and lower right and left views. The upper right middle view in FIG. 2 corresponds to the view according to FIG. 1, but without the leaf spring 111 or a sheet metal strip or the like as a carrier 111 with the joint 110 and without a detailed view of the fastening of the intermediate spring 60 to the main spring 40. The intermediate spring 60 can, for example, be fastened to the main spring 40 via rollover elements or cushioning elements at the posterior end and anterior end of the intermediate spring 60, for example by adhesion. A cushioning element can be arranged on the underside of the main spring 40 and prevents direct bearing of the guide element 80 on the underside of the main spring 40, which could lead to friction and wear of the leaf springs, which are generally made of a fiber composite material.

The lower right view in FIG. 2 shows the loading situation in the case of a heel strike, in which the holder 30 is tilted clockwise around the contact point on the intermediate spring 60. Both the upper, proximal heel component 51 and the lower, distal heel component 52 are compressed, the tensioning element 90 is relaxed, and the space between the main spring 40 and the guide element 80 is reduced. The proximal end of the main spring 40 has moved in the direction of the sole element 100 or toward the ground, and the posterior end of the holder 30 has moved in the direction of the main spring 40, such that the holder 30 almost touches the main spring 40. The loading at heel strike occurs predominantly in the posterior part via the heel element 50 and the sole element 100, such that the intermediate spring 60 and also the main spring 40 and the guide element 80 are substantially relaxed. The same applies to the toe spring 120, which is inserted with its front end in a recess in the foot cover 5 and is held therein with form-fit engagement.

During rollover or when standing, as shown for example in the middle upper right view in FIG. 2, there is a uniform vertical load on the heel element 50 and the holder 30 via the intermediate spring 60, the intermediate pieces or spacer elements, the main spring 40 and the toe spring 120.

The top left view shows a load at the end of the stance phase. The sole element 100 is lifted off the ground, and the maximum loading takes place at the point of contact of the toe spring 120 on the ground. The ground reaction force is introduced into the main spring 40, and the holder 30 pivots around the bearing point 110 on the intermediate spring 60. By virtue of the spaced-apart bearing in the anterior and posterior bearing regions 72, 71 of the intermediate spring 60 on the main spring, it is possible that the forces otherwise introduced via the front projection 34 at a single point on the main spring 40 can be distributed over the supporting holder 30 to two points or regions spaced apart from each other in the longitudinal extent of the main spring 40, such that a uniform introduction of force into the main spring 40 takes place at two places. The holder 30 is coupled to the sole element 100 or the guide element 80 via the tensioning element 90. By the counterclockwise rotation, the distal heel component 52 is compressed by the tensioning element 90 and the guide element 80 against the main spring 40. The proximal heel component, which is secured to the holder 30, lifts away from the main spring 40 and is maximally decompressed. Bending thus takes place between the front contact point of the main spring 40 and the point of attack or region of attack of the distal heel component 52 of the main spring 40. In contrast to heel strike, where the main spring 40 is not bent and the entire spring and damping effect takes place via the heel element 50 with the two heel components 51, 52 and optionally via the sole element 100 in cooperation with the cosmetic foot cover 5, the main spring 40 is brought into action upon rollover of the foot and loading of the forefoot. As soon as the force application vector moves in front of the fastening element 20, a compressive force is applied to the main spring 40 via the intermediate spring 60 and via the front end of the holder 30, which tensions the tensioning element 90 and leads to bending in particular of the main spring 40 and also bending of the guide element 80 and compression of the distal heel component 52.

Figure 3:
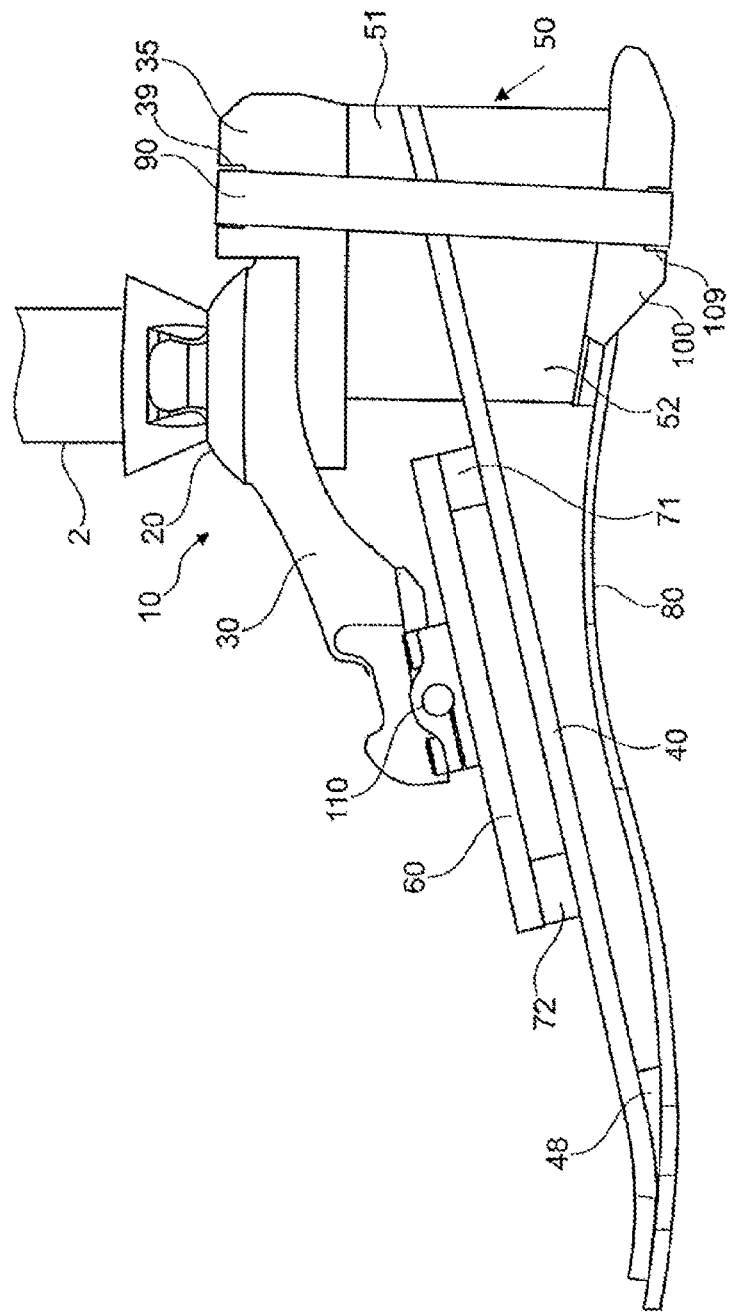
FIG. 3 shows a side view of an unloaded prosthetic foot insert.

FIG. 3 shows a variant of the prosthetic foot insert 10 according to FIG. 1 or 2. The basic structure remains the same, with the fastening element 20, with the holder 30 which with its front end is supported on a main spring 40 via an intermediate spring 60 and via two intermediate pieces in the regions 71, 72, the main spring 40 being connected in its front region to a guide element 80 which, in its rear or posterior region, guides a heel element 50 which is maintained in compression via a tensioning element 90.

In FIG. 3, which shows a side view of the unloaded prosthetic foot insert 10, the proximal component 2 is also shown in the form of a lower-leg tube, which can be secured reversibly to the fastening device 20 via a conventional pyramid adapter. At the front end of the holder 30, instead of the sheet metal plate 111 or the leaf spring 111 as a support mounted in an articulated manner on the intermediate spring 60, in the embodiment according to FIG. 3 the joint 110 is formed with a defined joint axle which, via a fastening element, for example a clamp adapter, is fastened to the intermediate spring 60. The axle can be fastened or formed at the front end of the holder 30, for example as stub axles, which are pivotably fixed to the intermediate spring 60 in two receptacles medially and laterally with respect to the holder 30.

Seen from the underside, the main spring 40 is convexly curved in its anterior region, such that an easier rollover can take place with loading of the forefoot. The guide element 80 is connected to the guide element 80 via a connecting device 48, for example an adhesive connection or a form-fit connection. The guide element 80 has an undulating shape, which is convex in the forefoot region, concave in the midfoot region, and straight or likewise convex in the heel region, in each case as seen from below. Over the course from anterior to posterior, the guide element 80 tapers in the midfoot region, although it can also have a constant material thickness that is substantially less than that of the main spring 40.

The sole element 100 has a recess 109 for guiding the tensioning element 90. Correspondingly, a recess 39 is formed in a heel part holder 35, in which the tensioning element 90 is guided, such that movement in the anterior-posterior direction is not possible in the unloaded state. The heel part holder 35 can be arranged exchangeably on the holder 30, for example can be plugged on and can be designed to be lockable by a positive snap-fit connection. It is likewise possible that the heel part holder 35 is permanently and irreversibly secured to the holder 30, for example welded or glued. The heel part holder 35 is part of the holder 30.

Figure 4:
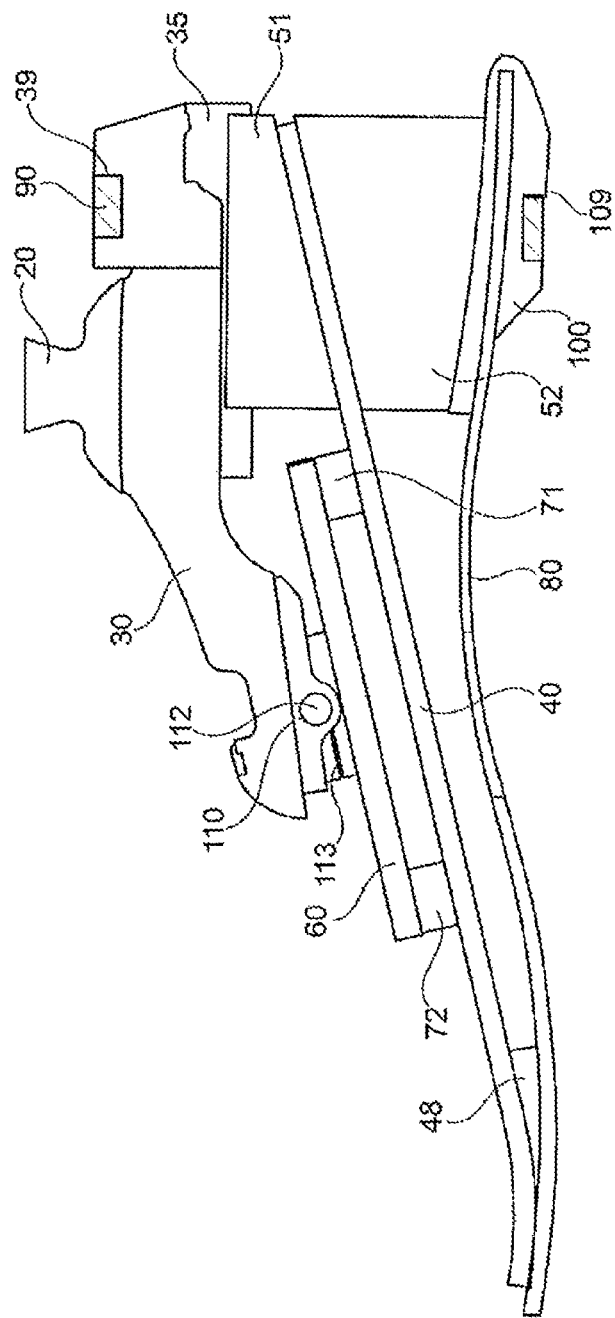
FIG. 4 shows a sectional view of a prosthetic foot insert.

FIG. 4 shows the prosthetic foot insert 10 according to FIG. 3 in a sectional view. The angular contour of the recesses 39, 109 for receiving the strap-like, tensionally rigid but flexible tensioning element 90 can likewise be seen, and also the substantially rectilinear configuration of the main spring 40 and of the intermediate spring 60. The joint 110 at the front end of the holder 30 has an axle pin 112, which is received pivotably on an axle pin receptacle 113. In the illustrative embodiment shown, the intermediate pieces for the spaced-apart securing of the intermediate spring 60 on the main spring 40 are integrally connected by gluing to the intermediate spring 60 and the main spring 40.

Figure 5:
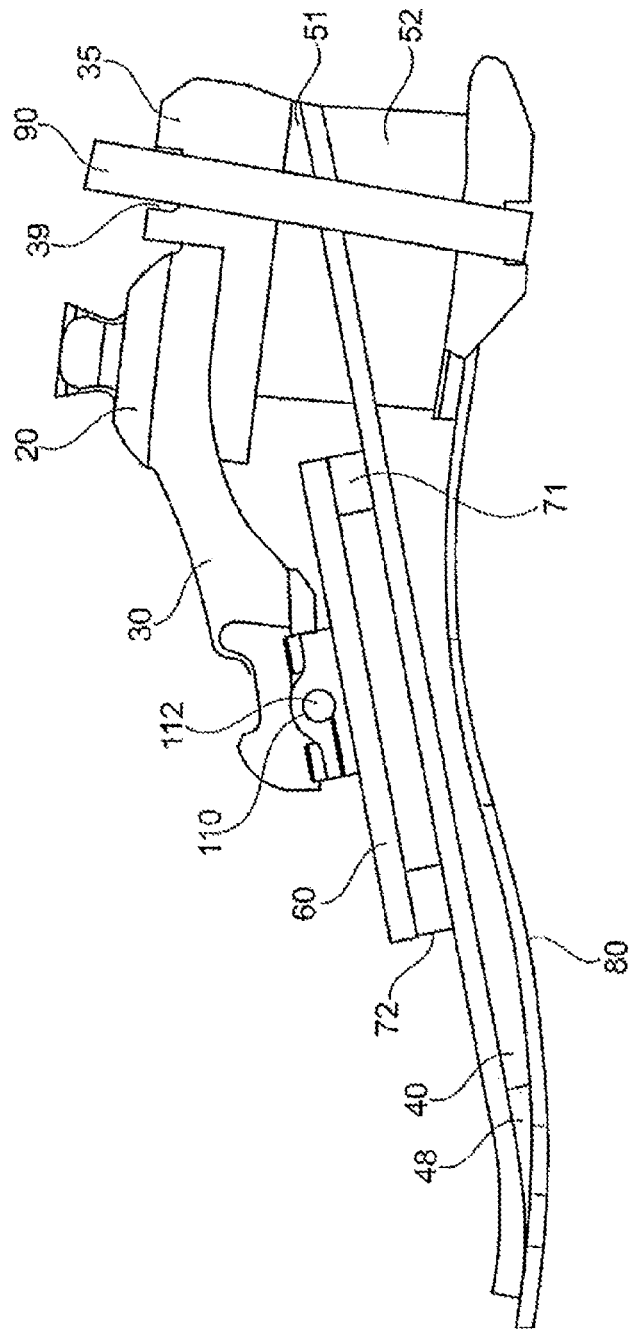
FIG. 5 shows a prosthetic foot insert at heel strike.

FIG. 5 shows the prosthetic foot insert according to FIG. 3 during heel strike. The proximal heel component 51 is maximally compressed, the heel part holder 35 at the posterior end of the holder 30 compresses the in particular posterior part of the heel component 51, just like the distal heel component 52. The holder 30 is pivoted clockwise about the pin 112, and the tensioning element 30 in the illustrative embodiment shown is sufficiently rigid to ensure that it moves out of the recess 39. If the tensioning element 90 is secured in the region of the recess 39, for example screwed on, clamped or glued, the tensioning element 90 will move medially and laterally outward during compression on account of a heel strike. Bending of the main spring 40 does not take place. An approximation of the guide element 80 to the underside of the main spring takes place in the midfoot region on account of the compression of the distal heel component 52.

Figure 6:
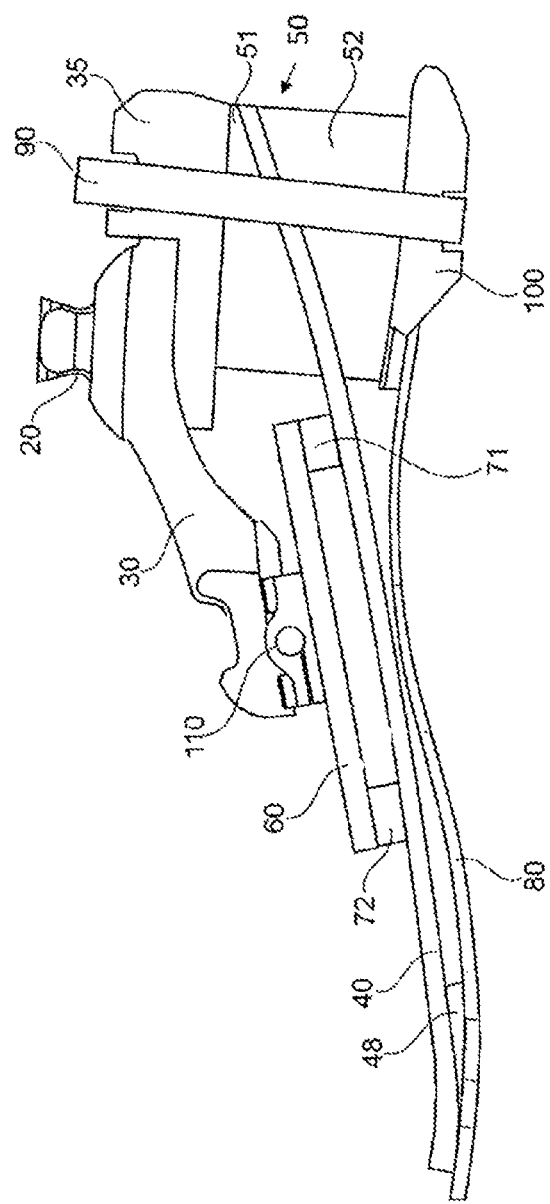
FIG. 6 shows a prosthetic foot insert in the middle stance phase.

FIG. 6 shows a continued movement after the heel strike according to FIG. 5, in which the forefoot region is lowered and the proximal component 2 (no longer shown) of the prosthesis is pivoted forward counterclockwise in the walking direction. As a result, the compressive force on the anterior end of the holder 30 is increased, such that a compressive force is exerted by the joint 110 centrally on the intermediate spring 60 which, via the two bearing blocks, then introduces the compressive force, spaced apart in the longitudinal direction, into the main spring 40. The main spring 40 is thereby bent between the front contact point and the rear end and approaches the guide element 80 in the midfoot region. The tensioning element 90 moves again in the direction of the heel part holder 35, with increasing unloading of the elastic heel element 50.

Figure 7:
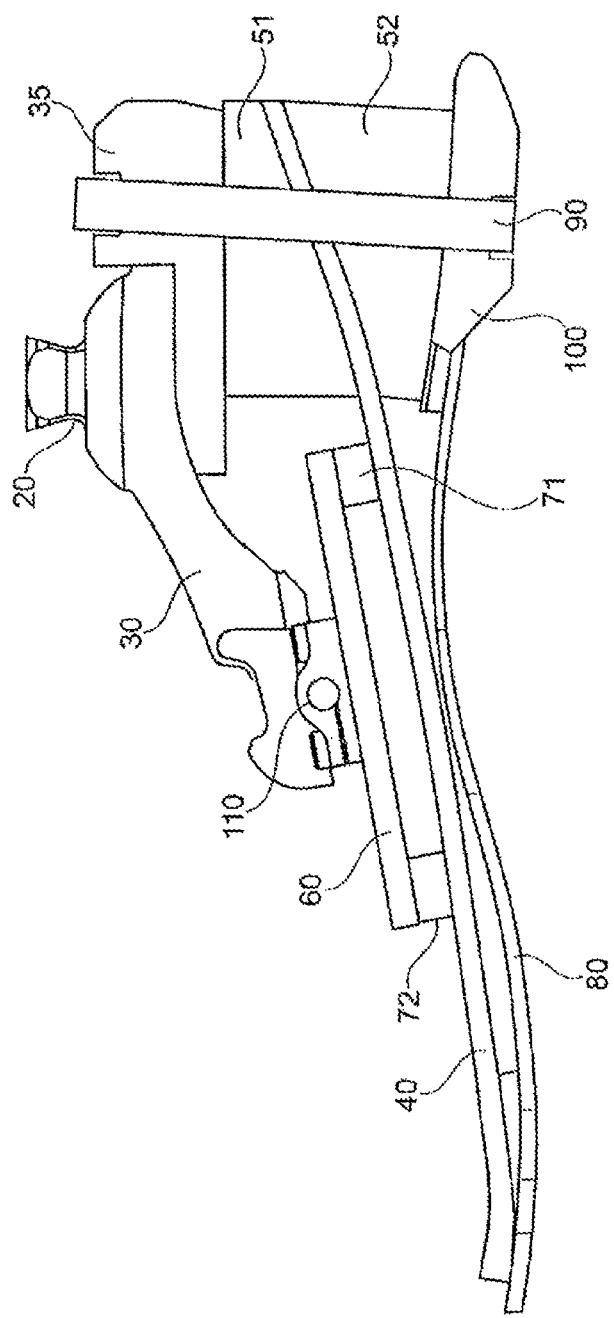
FIG. 7 shows a prosthetic foot insert during rollover.
Figure 8:
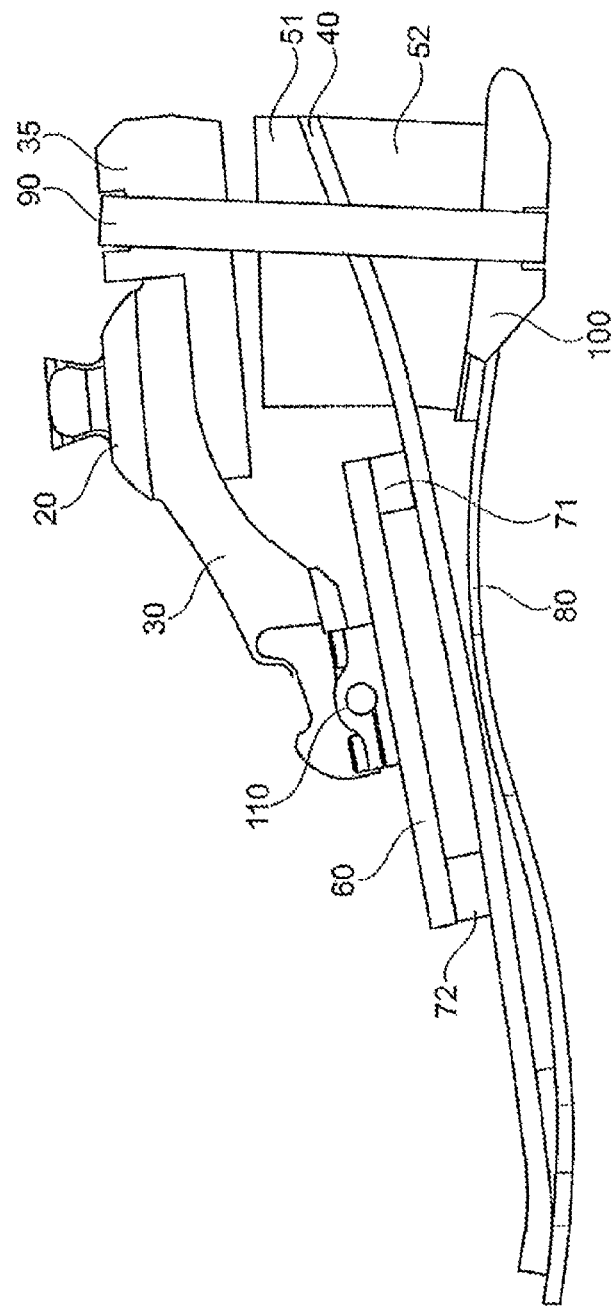
FIG. 8 shows a prosthetic foot insert in the terminal stance phase.

FIG. 7 shows the prosthetic foot insert 10 with increasing loading of the forefoot; the force application point has migrated further forward, and the two heel components 51, 52 are almost completely unloaded. The proximal heel component 51 bears with its upper face on the underside of the holder 30 or of the heel part holder 35; the tensioning element 90 transmits a tensile force from the holder 30 via the heel part holder 35 to the sole element 100 and thus to the guide element 80. As a result, the distal heel component 52 is compressed and pressed against the main spring 40, such that, in addition to the bending of the main spring 40 by the spaced-apart introduction of compressive forces in the two regions 71, 72, a restoring force is provided via the elastic distal heel component 52. In addition to the spring properties of the intermediate spring 60 and of the main spring 40, the distal heel component 52 provides a further elastic component, via which it is additionally possible to adjust the spring properties and spring-back properties of the prosthetic foot insert 10.

In a further rollover movement of the prosthetic foot, the loading of the forefoot is further increased, the guide element 80 approaches closer to the underside of the main spring 40, and the distal heel component 52 is further compressed. In the illustrative embodiment shown, the proximal heel component 51 is secured to the main spring 40, such that the holder 30 or, if present, the heel part holder 35 detaches from the proximal heel component 51. With loading of the forefoot, the proximal heel component 51 has no further spring action when the force application vector from the proximal component 2 leads to counterclockwise pivoting about the joint 110.

On account of the different loading situations of the respective heel components 51, 52, it is possible to individually adapt the spring properties of the prosthetic foot insert 10. For example, the distal heel component 52 can be made harder than the proximal heel component 51. A harder distal heel component 52 means that greater resistance to deformation greater than that of a proximal heel component 51 is provided. It is thereby possible to permit the patient an at first comparatively soft heel strike via the proximal heel component 51. It is additionally possible to fix the soft compression travel via the dimension of the proximal heel component 51. Starting from a defined compression and deformation of the proximal heel component 51, the distal heel component 52 also acts. On account of the greater spring stiffness of the distal heel component 52, this leads to rapid plantar flexion and a secure stance when it becomes effective. Upon additional loading of the heel, the distal heel component 52 yields further, albeit to a lesser extent compared to the proximal heel component 51.

By virtue of the fact that the forces transmitted from the holder 30 to the main spring 40 upon loading of the forefoot are supported at two spaced apart locations or regions 71, 72, a uniform introduction of force is permitted, such that the spring properties of the main spring 40, designed as a leaf spring, can be optimally utilized. As a result, the main spring 40 can be made comparatively thinner and lighter or, if of the same configuration, can have a greater durability compared to a punctiform application of force. The intermediate spring 60 can be designed to be exchangeable and can be adapted to the respective patient or to the intended loads.

As a result of the proximal heel component 51 being secured only at one end, either to the holder 30 or to the main spring 40, no tensile forces are transmitted through the proximal heel component 51, which fact serves the durability of the proximal heel component 51 preferably made of a foam material. The distal heel component 52 is preferably permanently in a pre-tensioned state between the main spring 40 and the guide element 80 or the sole element 100.

The joint 110 is preferably arranged in the midfoot region, particularly preferably in the middle of the main spring 40, such that an optimal force distribution from the holder 30 to the main spring 40 can be achieved if the regions 71, 72 are arranged uniformly in the longitudinal extent of the prosthetic foot insert 10 to the joint 110. By shifting the regions 71, 72 or having them spaced apart non-uniformly from the joint 110, different spring properties of the main spring 40 can be realized.

Figure 9:
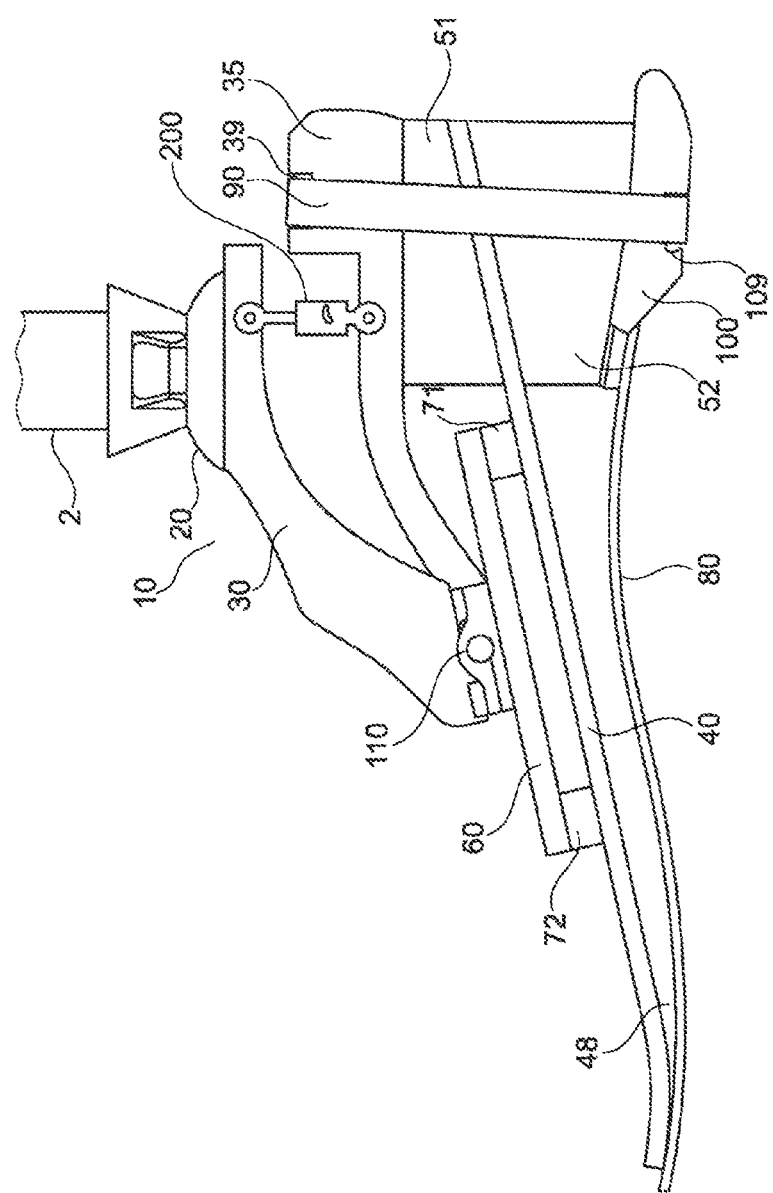
FIG. 9 shows a variant of FIG. 4 with a damper.

FIG. 9 shows a variant of FIG. 4, in which a damper 200 is arranged between the main spring 4 and the holder 30. In the illustrative embodiment shown, the damper 200 is mounted between a proximal, upper branch of the holder 30 and a lower branch, which is supported on the intermediate spring 60 and the proximal heel component 51 on the main spring 40. The distal branch is mounted pivotably about the pivot axis of the joint 110, such that the fastening device 20 and thus also the proximal component 2 can be pivoted relative to the main spring 40. The damper 200 can be designed as a pneumatic damper and/or hydraulic damper. Alternatively, the damper 200 can be designed as an actuator that can be operated in a drive mode and/or in a damping mode. In an embodiment as an actuator, the distance between the two branches and thus the distance between the fastening device 20 and the main spring 40 can be actively changed. By way of the actuator, a motorized adjustment with respect to the inclination can be effected on account of the pivoting of the proximal branch, and of the fastening device 20 arranged thereon, relative to the main spring 40, as a result of which, for example, an adaptation to different heel heights can be carried out. In an embodiment as a pure damper, a constant force, for example, or a constant moment around the joint 110 can result in lowering or forward tilting. A slow sinking or lifting permits a correct setting of the desired heel height, for example by valves inside the damper 200 being closed when the desired position is reached. Likewise, in an embodiment as an actuator, a drive can be stopped and locked when the desired orientation or the desired distance and/or angle of the fastening device 20 relative to the main spring 40 or to the ground has been reached. It is also possible in principle to change the damping by motorized means, if an actuator or motor is provided for this purpose. The motor or drive can then be adjusted via a control device and a sensor arrangement during walking, in order to permit adaptation to different walking speeds, loads or walking situations. In an embodiment of the damper 200 as a hydraulic and/or pneumatic damper, it can be equipped with a sequence valve which, only when a predetermined moment or a predetermined force is exceeded, permits the movement and thus acts as a kind of overload protection. In addition, an adjustment can be carried out via the sequence valve when the limit force is exceeded, and, after the correspondingly high adjustment force ceases, a locking can be maintained in the desired position.

Figure 10:
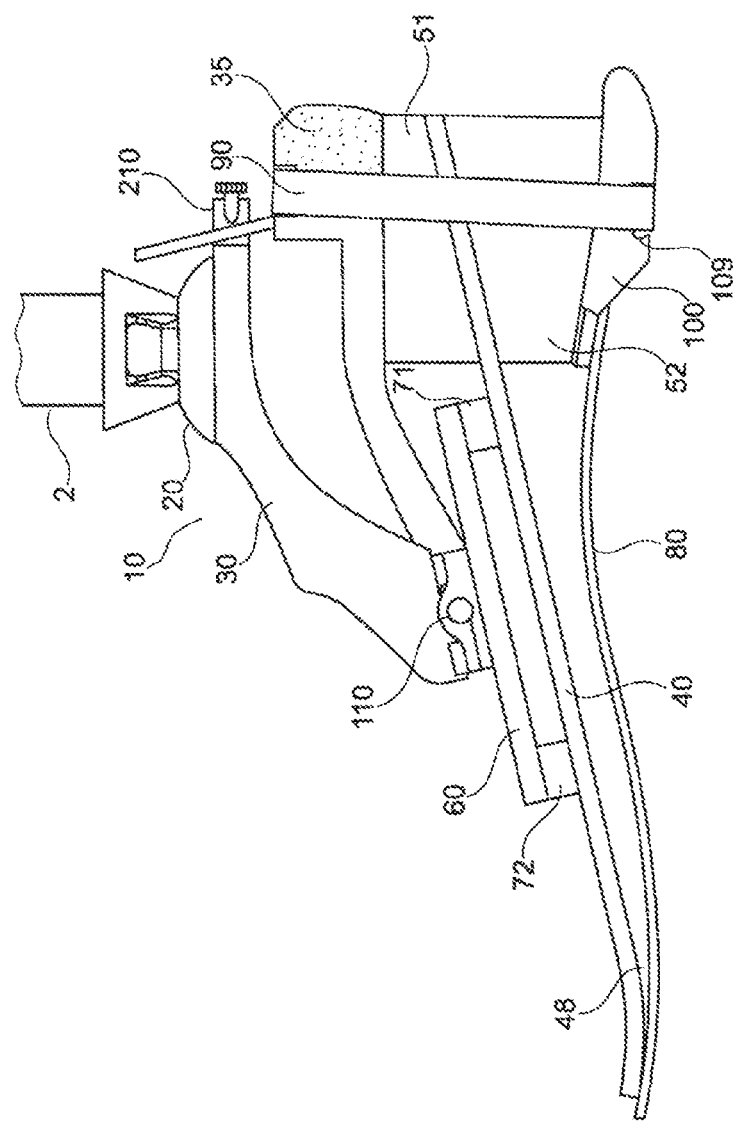
FIG. 10 shows a variant of FIG. 4 with an adjustable holder.

FIG. 10 shows a further variant of the prosthetic foot insert, the design of which corresponds substantially to that of FIG. 9. Here too, the holder 30 is divided in two and has a proximal branch, which is displaceable relative to a distal branch about the joint 110 and a pivot axis. In the posterior region of the proximal branch, a locking device 210 is arranged via which the proximal branch is adjusted in discrete steps or continuously relative to the distal branch and can be fixed in the respective position. The two branches can also be adjusted relative to each other by motorized means. The motor or drive can then be activated and deactivated via a control device or a sensor arrangement during walking.

Figure 11:
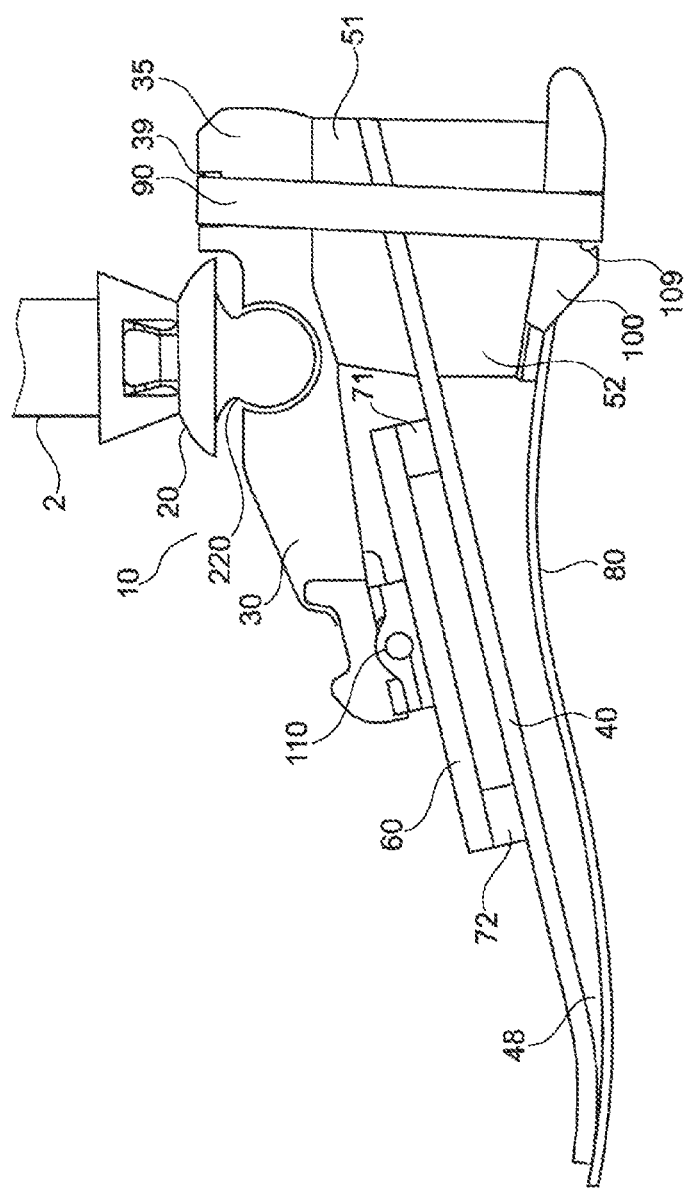
FIG. 11 shows a variant with a displaceable fastening device.

FIG. 11 shows a further variant of the prosthetic foot insert with a fastening device 20 arranged in a displaceable manner on the holder 30. The fastening device 20 has, for example, a distal spherical component 220 which is introduced into a corresponding recess within the holder 30. Other bearing concepts, such as a universal joint or single-axis or multi-axis pivotability are alternatives. The bearing permits pivoting, rotating or shifting of the fastening device 20 relative to the holder 30. When the target position of the fastening device 20 is reached, for example in the context of a heel height adjustment, the fastening device 20 is fixed to the holder 30, for example by clamping elements, screws or form-fit elements or by interrupting a drive of a self-locking drive device, for example a spindle. The displaceable fastening device 20 according to FIG. 11 can also be provided in the case of a multi-part design of the holder 30 according to FIGS. 9 and 10, in particular if a heel height adaptation takes place by changing the distal-proximal distance of the fastening device 20 relative to the main spring 40. In addition to the locking device 210, which is shown in FIG.

10, other locking devices or fixing elements can be provided in order to fix the position of the holder 30 and the position of the fastening device 20 relative to the holder 30, for example by spacer elements, stops, adjusting screws, locking screws or the like.

Figure 12:
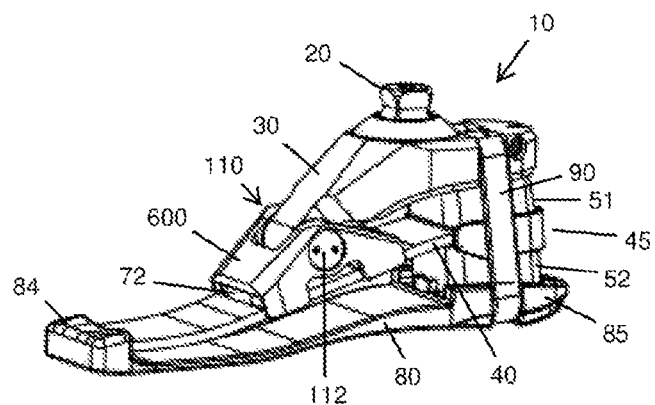
FIG. 12 shows a perspective view of a prosthetic foot insert.

FIG. 12 shows a perspective overall view of a prosthetic foot insert 10 in a further variant of the invention. The fastening element 20 on the holder 30 is designed as a pyramid adapter and is used for fastening to a proximal prosthesis component (not shown), for example a lower-leg tube or a lower-leg socket. The holder 30 is in particular made of a dimensionally stable material and is provided at its front end with a bore through which an axle pin 112 is passed in order to form a joint 110 between the holder 30 and a carrier 600. The carrier 600 corresponds to the intermediate spring or the intermediate element of the previous embodiments, but without having significant suspension properties.

Lateral projections are arranged at the front and rear ends of the carrier 600 and are spaced apart from each other substantially in the width of the main spring 40, such that the main spring 40 can be received between the projections. The carrier 600 is supported on the main spring 40 via intermediate pieces, of which only the front intermediate piece 72 can be seen in this view. The main spring 40 can be connected to the carrier 600 by an adhesive connection, a clamp connection and/or a form-fit connection. It is likewise possible that the carrier has transverse projections at the lower end of the projections, such that a C-shaped or slit-like receptacle is formed for the main spring 40. The main spring 40 can then be pushed into this receptacle. The main spring 40 can then also be fixed on the carrier 600 via the intermediate pieces, form-fit elements, a clamp connection and/or an adhesive connection.

The front end of the main spring 40 is mounted with form-fit engagement on the guide element 80 or a base spring. For this purpose, a front receptacle 84 or a pocket, into which the main spring 40 is inserted, is formed at the front end of the guide element 80. Additional fixing can be effected via pins, bolts, hooks, screws, clip connections, hook-and-loop fasteners, other form-fit connections and/or clamp connections and/or cohesive connections. The main spring 40 is preferably mounted detachably and exchangeably on the front end of the guide element 80, such that non-destructive removal of the main spring 40 or replacement of the guide element 80 can be carried out for repair purposes, for adaptation purposes or for setting purposes. The front receptacle 84 can be formed as an integral constituent part of the guide element 80. Alternatively, the front receptacle 84 can be produced as a separate element and permanently fastened to the guide element 80, for example welded, glued or fixed by fastening elements.

A rear receptacle 85 for the heel element 50 is arranged or formed at the rear end of the guide element 80. The rear receptacle 85 can also either be formed in one piece as an integral constituent part of the guide element 80 or can be produced separately and fastened to the guide element 80, corresponding to the front receptacle 84. The rear receptacle 85 has protruding regions on all sides, which are oriented in the proximal direction such that the distal heel component 52 can be inserted inside these protruding regions. The rear receptacle 85 ensures that the distal heel component 52 cannot execute any lateral movements or any movements that are directed in and counter to the walking direction. Likewise, a rotation of the distal heel component 52 is not possible. The distal heel component 52 is placed on the guide element 80.

Located above the distal heel component 52 is the main spring 40, on the rear end of which a cap 45 is pushed on or fitted, which cap forms a lateral and rear frame-like projection. This prevents the upper end of the distal heel component 52 from being able to move laterally or rearward. The lateral and rear projection of the cap 45 also extends in the proximal direction away from the top of the main spring 40 and thus serves as a receptacle and guide for the proximal heel component 51. The proximal heel component 51 lies with its proximal upper face on the underside of the holder 30, either directly or via intermediate pieces or a further holder.

As a tensioning element 90, a strap is guided over the top of the holder 50 and medially and laterally of the two heel components 51, 52 of the main spring 40. On the underside, the strap 90 is guided beneath the rear receptacle 85 under the guide element 80, such that the main spring 40 is mounted between the two heel components 51, 52 and is clamped between the holder 30 and the guide element 80.

In the illustrated, unloaded situation of the prosthetic foot insert 10, the tensioning element 90 is slightly pretensioned, such that the two heel components 51, 52 are held in a clamped manner between the holder 30, the main spring 40 and the guide element 80. In the case of a heel strike, at least one of the heel components 51, 52 is compressed and the strap 90 slackens. In order to prevent the strap 90 from detaching from the holder 30 and/or from the guide element 80, the strap 90 can be fixed there. For better guidance and as protection against external influences, recesses or grooves, in which the strap 90 is guided, are incorporated in the holder 30 and the rear receptacle 85.

Figure 13:
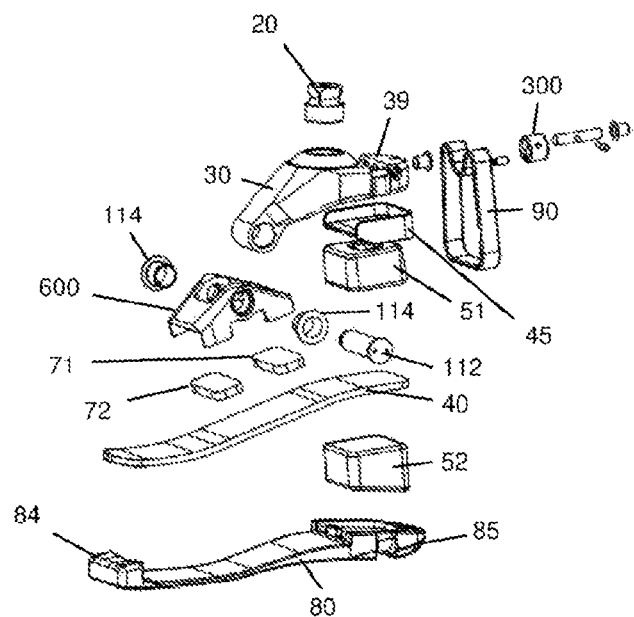
FIG. 13 shows an exploded view of the prosthetic foot insert according to FIG. 12.

The individual components of the prosthetic foot insert 10 are shown in the exploded view in FIG. 13. The fastening element 20 is designed as a screw-in pyramid adapter, which can be screwed into a thread within the holder 30. The groove-shaped recess 39 in which the strap 90 is guided is worked into the holder 30, behind the fastening element 20 in the walking direction. In order to change the strap tension, an eccentric 300 is mounted in the holder 30. The eccentric 300 is accessible from the rear face of the holder 30 and, by rotation from a starting position, permits a change in the strap tension.

The cap 45 is constructed as a frame which protrudes medially and laterally and also on the back proximally and distally from a support, in order to provide a guide for the heel component 51, 52. A plate, an inwardly protruding frame, several decorative elements or a slit can be formed as a support within the frame. It is thus possible that the cap 45 is placed on the main spring 40, the main spring 40 is placed on the cap 45, or the rear end of the main spring 40 can be inserted into the slit of the cap 45. The cap 45 can be fastened to the rear end of the main spring 40 with force-fit engagement, form-fit engagement and/or by cohesive bonding.

At the front end of the carrier 30, the bore for receiving the axle pin 112 can be seen, which axle pin is supported in sleeves 114 within bores in the carrier 600. The carrier 600 is constructed like a bridge and has two contact regions, such that contact between the carrier 600 and the main spring 40 takes place via the two intermediate pieces 71, 72 at a distance from each other. The introduction of force into the main spring 40 in the event of a pressure load from above thus takes place spaced apart in the longitudinal extent of the main spring 40, such that the holder 30 is supported on the main spring 40 by the carrier 600 and the intermediate pieces 71, 72 via a 2-point bearing.

The bearing points of the main spring 40, spaced apart from the intermediate pieces 71, 72 in the longitudinal extent, at their front end and at the rear end on the guide element 80 and the distal heel component 52, thus together form a 4-point bearing of the main spring 40.

The two heel components 51, 52 are preferably designed as foam elements or foam blocks and can have different elasticities and damping properties. The heel components 51, 52 can be mounted exchangeably, in particular exchangeably without destruction, within the prosthetic foot insert 10. After removal of the tensioning element 90, the holder 30 for example can be folded upward about the joint 110 and the proximal heel component 51 removed. This takes place correspondingly with the distal heel component 52.

Figure 14:
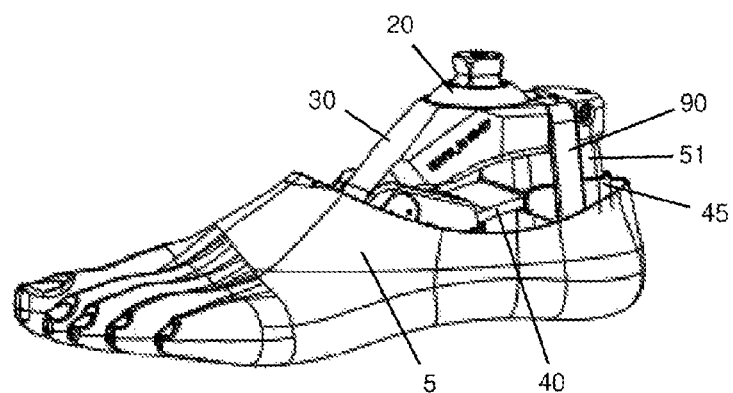
FIG. 14 shows a prosthetic foot insert according to FIG. 12 with a cosmetic cover.

In FIG. 14, the assembled prosthetic foot insert 10 according to FIG. 12 is provided with a cosmetic cover 5 which reproduces the shape of a natural foot. The cosmetic cover 5 serves in particular to protect the mechanical components of the prosthetic foot insert 10 from external influences, to protect a shoe in which the prosthetic foot insert 10 is worn, and the environment. To ensure that no damage or injuries can be caused by sharp-edged or hard components of the prosthetic foot insert 10, the prosthesis cover is advantageously made of a soft and resilient material, for example a polyurethane, a polyethylene or a silicone material or a combination of several materials.

The invention claimed is:

1. A prosthetic foot insert comprising:
    a proximal fastening device for securing the prosthetic foot insert to a proximal component, a holder arranged distally with respect to the proximal fastening device and coupled to the proximal fastening device, an elastic heel element which is arranged on the holder, and a main spring which extends into a forefoot region and is coupled to the holder;
    wherein the main spring is mounted on the elastic heel element between a proximal heel component and a distal heel component;
    the holder has a projection which protrudes in a direction of the forefoot region past the proximal fastening device and which is attached to the main spring;
    the holder is attached to the main spring via an intermediate element;
    the holder and the intermediate element are attached to the main spring at two regions spaced apart from each other in a longitudinal extent of the main spring; and
    the intermediate element is fastened to the main spring by a fastener such that the intermediate element remains stationary relative to the main spring, wherein the main spring is coupled to the proximal heel component in a manner not transmitting tensile forces.

2. The prosthetic foot insert as claimed in claim 1, wherein the distal heel component is rigid, and the proximal heel component is secured to the holder and the main spring.

3. The prosthetic foot insert as claimed in claim 1, wherein the distal heel component is harder than the proximal heel component.

4. The prosthetic foot insert as claimed in claim 1, wherein the main spring separates the proximal heel component and the distal heel component.

5. The prosthetic foot insert as claimed in claim 1, wherein the main spring is designed as a leaf spring.

6. The prosthetic foot insert as claimed in claim 1, wherein a guide element is fastened to the elastic heel element and is mounted on the main spring.

7. The prosthetic foot insert as claimed in claim 6, wherein the guide element is fastened to a front end of the main spring.

8. The prosthetic foot insert as claimed in claim 6, wherein the guide element reduces or blocks a displacement of the elastic heel element in a medial-lateral direction and permits a compression or expansion of the elastic heel element.

9. The prosthetic foot insert as claimed in claim 1, wherein the elastic heel element is coupled to the holder via at least one tensioning element.

10. The prosthetic foot insert as claimed in claim 9, wherein the at least one tensioning element holds the elastic heel element in a compressed position.

11. The prosthetic foot insert as claimed in claim 9, wherein the at least one tensioning element is guided distally with respect to the distal heel component.

12. The prosthetic foot insert as claimed in claim 9, wherein the at least one tensioning element tensions the distal heel component against the main spring when a forefoot is loaded.

13. The prosthetic foot insert as claimed in claim 1, wherein a sole element is arranged on the distal heel component or on a guide element.

14. The prosthetic foot insert as claimed in claim 1, wherein the holder is coupled to the main spring or the intermediate element via a joint.

15. The prosthetic foot insert as claimed in claim 14, wherein the joint is arranged in a midfoot region.

16. The prosthetic foot insert as claimed in claim 1, wherein a toe element is fastened to a front end of the main spring.

17. The prosthetic foot insert as claimed in claim 1, wherein the proximal heel component and distal heel component are made from a foam material, hollow body, elastomer element, carbon element, elastomer element with cavity acting as a pump chamber, and/or helical spring elements.

18. The prosthetic foot insert as claimed in claim 1, wherein the main spring, the intermediate element, and a toe element are designed as straight leaf springs.

19. The prosthetic foot insert as claimed in claim 1, wherein a damper or actuator is arranged between the holder and the main spring.

20. The prosthetic foot insert as claimed in claim 19, wherein the damper is lockable.

21. The prosthetic foot insert as claimed in claim 19, wherein the damper contains a sequence valve.

22. The prosthetic foot insert as claimed in claim 1, wherein the holder is designed to be adjustable in order to set a proximal-distal distance of the proximal fastening device from the main spring.

23. The prosthetic foot insert as claimed in claim 1, wherein the proximal fastening device is mounted in a displaceable, articulated or rotatable manner on the holder.

24. The prosthetic foot insert as claimed in claim 1, wherein the intermediate element comprises at least one of an intermediate spring, an intermediate plate, or a carrier.

25. The prosthetic foot insert as claimed in claim 1, wherein the fastener comprises straps, clamps, screws, or an adhesive.

26. A prosthetic foot insert comprising:
    a proximal fastening device for securing the prosthetic foot insert to a proximal component, a holder arranged distally with respect to the proximal fastening device and coupled to the proximal fastening device, an elastic heel element which is arranged on the holder, and a main spring which extends into a forefoot region and is coupled to the holder;

wherein the main spring is mounted on the elastic heel element between a proximal heel component and a distal heel component;

the holder has a projection which protrudes in a direction of the forefoot region past the proximal fastening device and which is attached to the main spring;

the holder is attached to the main spring via an intermediate element;

the holder and the intermediate element are attached to the main spring at two regions spaced apart from each other in a longitudinal extent of the main spring; and the intermediate element is fastened to the main spring by a fastener such that the intermediate element remains stationary relative to the main spring, wherein the elastic heel element is coupled to the holder via at least one tensioning element, wherein the at least one tensioning element is guided distally with respect to the distal heel component.

27. A prosthetic foot insert comprising:

a proximal fastening device for securing the prosthetic foot insert to a proximal component, a holder arranged distally with respect to the proximal fastening device and coupled to the proximal fastening device, an elastic heel element which is arranged on the holder, and a main spring which extends into a forefoot region and is coupled to the holder;

wherein the main spring is mounted on the elastic heel element between a proximal heel component and a distal heel component;

the holder has a projection which protrudes in a direction of the forefoot region past the proximal fastening device and which is attached to the main spring;

the holder is attached to the main spring via an intermediate element;

the holder and the intermediate element are attached to the main spring at two regions spaced apart from each other in a longitudinal extent of the main spring; and the intermediate element is fastened to the main spring by a fastener such that the intermediate element remains stationary relative to the main spring, wherein the elastic heel element is coupled to the holder via at least one tensioning element, wherein the at least one tensioning element tensions the distal heel component against the main spring when a forefoot is loaded.

28. A prosthetic foot insert comprising:

a proximal fastening device for securing the prosthetic foot insert to a proximal component, a holder arranged distally with respect to the proximal fastening device and coupled to the proximal fastening device, an elastic heel element which is arranged on the holder, and a main spring which extends into a forefoot region and is coupled to the holder;

wherein the main spring is mounted on the elastic heel element between a proximal heel component and a distal heel component;

the holder has a projection which protrudes in a direction of the forefoot region past the proximal fastening device and which is attached to the main spring;

the holder is attached to the main spring via an intermediate element;

the holder and the intermediate element are attached to the main spring at two regions spaced apart from each other in a longitudinal extent of the main spring; and the intermediate element is fastened to the main spring by a fastener such that the intermediate element remains stationary relative to the main spring, wherein the holder is coupled to the main spring or the intermediate element via a joint, wherein the joint is arranged in a midfoot region.

29. A prosthetic foot insert comprising:

a proximal fastening device for securing the prosthetic foot insert to a proximal component, a holder arranged distally with respect to the proximal fastening device and coupled to the proximal fastening device, an elastic heel element which is arranged on the holder, and a main spring which extends into a forefoot region and is coupled to the holder;

wherein the main spring is mounted on the elastic heel element between a proximal heel component and a distal heel component;

the holder has a projection which protrudes in a direction of the forefoot region past the proximal fastening device and which is attached to the main spring;

the holder is attached to the main spring via an intermediate element;

the holder and the intermediate element are attached to the main spring at two regions spaced apart from each other in a longitudinal extent of the main spring; and the intermediate element is fastened to the main spring by a fastener such that the intermediate element remains stationary relative to the main spring, wherein the main spring, the intermediate element, and a toe element are designed as straight leaf springs.

* * * * *